JOHN BOWMAN.

Improvement in Gopher Traps.

No. 123,807.

Patented Feb. 20, 1872.

UNITED STATES PATENT OFFICE.

JOHN BOWMAN, OF SANTA CRUZ, CALIFORNIA.

IMPROVEMENT IN GOPHER-TRAPS.

Specification forming part of Letters Patent No. 123,807, dated February 20, 1872.

Specification describing a certain Improved Gopher-Trap, invented by JOHN BOWMAN, of Santa Cruz, in the county of Santa Cruz and State of California.

Figure 1:
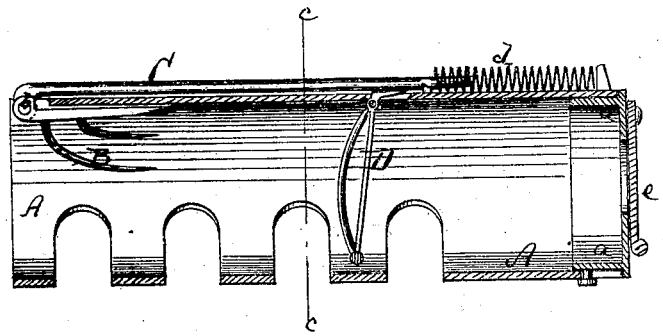
Figure 2:
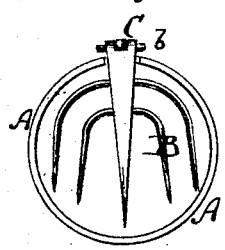
Figure 4:
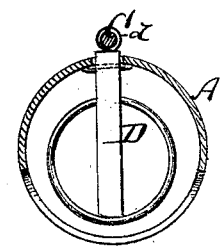
Figure 3:
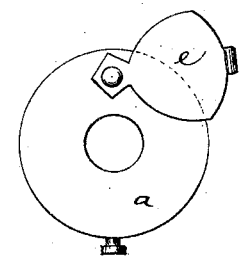
Figure 5:
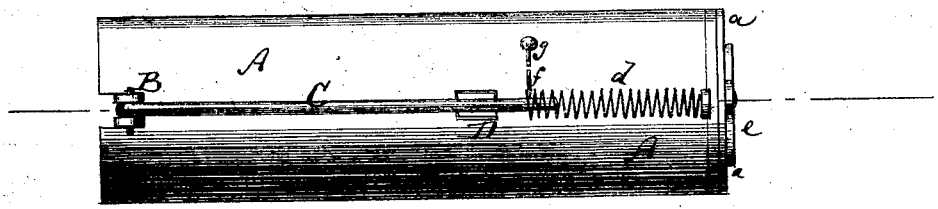

Figure 1 represents a longitudinal vertical section of my improved gopher-trap. Figs. 2 and 3 are end views of the same. Fig. 4 is a vertical transverse section of the same on the line $c$ $c$, Fig. 1. Fig. 5 is a top view of the same.

Similar letters of reference indicate corresponding parts.

This invention relates to improvements on a tubular gopher-trap, and has for its object to provide convenient means for conforming to the habits of the animal to be caught. The invention consists principally in providing the outer end of the trap with an appliance whereby the interior can be made light or dark at will. The gopher's habit is to repair whatever damage is done to its burrow, to close holes that may be made by outsiders, and open such that have been closed. The trap can be adjusted to suit either plan, and is made dark when put within an open hole, to cause the attempt at reopening and light when put into a closed passage to attract the animal's attention and attempt at reclosing. The invention further consists in a peculiar arrangement of spring, trigger, and swinging gate, all being so made that the trap cannot easily get out of order, and will be convenient for use and inspection.

A in the drawing represents the tubular body of the trap, made of proper size, with one—the inner—end open, and the outer end closed, by a removable cap, $a$. The lower side of the tube is perforated, but the upper entirely closed, to cover the interior thereof. B is a swinging gate, pivoted by a pin, $b$, to the end of a rod, C. This rod is arranged on top of the tube A, its outer end being secured to a spiral spring, $d$, which tends to draw it outward. D is the trigger pivoted within the tube A, to catch into a notch of the rod C, when the same is drawn inward and lock it, so as to hold the gate folded against the inner side of the tube. When the trigger is touched to be disengaged from the rod, the spring immediately draws the rod outwardly, and thereby causes the gate B to swing across the inner end of the tube. The tube is placed into one end of the passage which has been dug by the animal, a suitable bait being placed, if desired, against the outer end of the trigger. The cap $a$ has an aperture through it, which can be closed or opened by a pivoted or sliding plate, $e$. By means of this plate the trap is made light or dark, in conformity to the above-mentioned habit of the gopher. The gate is swung up to open the inner end of the tube, and is so held by means of the trigger. When the animal touches the trigger the rod is released and the gate is swung down to close the inner end of the tube, and thereby entrap the gopher. An index, $f$, projects from the rod C, in order to show by its relative position to a fixed mark, $g$, whether the trap is sprung, making the taking up of the trap for such investigation unnecessary.

The entrapped animal can be discharged from the trap by swinging the trigger out of the way, and removing the cap, or by opening the gate.

Having thus described my invention, I claim as new, and desire to secure by Letters Patent—

1. The pivoted cap $e$, in combination with the perforated end $a$ of the tubular body of the gopher trap, which is open at its opposite end, and provided with suitable mechanism for closing the same.

2. The combination of the swinging gate B, sliding rod C, spring $d$, and trigger D, with the tube A, substantially as herein shown and described, all operating as set forth.

JOHN BOWMAN.

Witnesses:
E. J. HENDERSON,
P. R. HINDS.